United States Patent
Piemonte et al.

(10) Patent No.: US 10,558,037 B2
(45) Date of Patent: Feb. 11, 2020

(54) SYSTEMS AND METHODS FOR DETERMINING AN OBJECT THROUGH A DISAMBIGUATED SELECTION IN A MIXED REALITY INTERFACE

(71) Applicant: Apple Inc., Cupertino, CA (US)

(72) Inventors: Patrick S. Piemonte, San Francisco, CA (US); Wolf Kienzle, Seattle, WA (US); Douglas Bowman, Blacksburg, VA (US); Shaun D. Budhram, San Jose, CA (US); Madhurani R. Sapre, San Jose, CA (US); Vyacheslav Leizerovich, San Jose, CA (US); Daniel De Rocha Rosario, San Francisco, CA (US)

(*) Notice: Subject to any disclaimer, the term of this patent is extended or adjusted under 35 U.S.C. 154(b) by 0 days.

(21) Appl. No.: 15/710,397

(22) Filed: Sep. 20, 2017

(65) Prior Publication Data
US 2018/0088324 A1    Mar. 29, 2018

Related U.S. Application Data

(60) Provisional application No. 62/398,579, filed on Sep. 23, 2016.

(51) Int. Cl.
| | |
|---|---|
| *G02B 27/01* | (2006.01) |
| *G06F 3/01* | (2006.01) |
| *G06F 3/0481* | (2013.01) |
| *H04W 4/02* | (2018.01) |
| *G06F 16/58* | (2019.01) |

(Continued)

(52) U.S. Cl.
CPC ............. *G02B 27/01* (2013.01); *G06F 3/017* (2013.01); *G06F 3/04817* (2013.01); *G06F 16/58* (2019.01); *H04W 4/027* (2013.01); *G02B 2027/014* (2013.01); *G06F 16/00* (2019.01); *G10L 15/00* (2013.01)

(58) Field of Classification Search
CPC ...... G06F 3/017; G06F 3/04817; G06F 17/30; G06F 17/30265; H04W 4/027; G02B 27/01; G02B 2027/014; G10L 15/00
See application file for complete search history.

(56) References Cited

U.S. PATENT DOCUMENTS

| | | |
|---|---|---|
| 6,671,615 B1 | 12/2003 | Becker et al. |
| 2009/0319175 A1 | 12/2009 | Khosravy et al. |

(Continued)

FOREIGN PATENT DOCUMENTS

| | | |
|---|---|---|
| EP | 1734341 | 12/2006 |
| WO | WO 2009/098154 | 8/2009 |

*Primary Examiner* — Ryan A Lubit
(74) *Attorney, Agent, or Firm* — Polsinelli PC

(57) ABSTRACT

Implementations described and claimed herein provide systems and methods for interaction between a user and a machine. In one implementation, a system is provided that receives an input from a user of a mobile machine which indicates or describes an object in the world. In one example, the user may gesture to the object which is detected by a visual sensor. In another example, the user may verbally describe the object which is detected by an audio sensor. The system receiving the input may then determine which object near the location of the user that the user is indicating. Such a determination may include utilizing known objects near the geographic location of the user or the autonomous or mobile machine.

21 Claims, 13 Drawing Sheets

(51) Int. Cl.
   *G06F 16/00*   (2019.01)
   *G10L 15/00*   (2013.01)

(56) References Cited

U.S. PATENT DOCUMENTS

| | | | |
|---|---|---|---|
| 2015/0268822 A1* | 9/2015 | Waggoner | G06F 3/04842 |
| | | | 715/722 |
| 2015/0293597 A1* | 10/2015 | Mishra | G06F 1/163 |
| | | | 715/810 |
| 2015/0309578 A1* | 10/2015 | McCoy | G06F 3/017 |
| | | | 715/863 |
| 2015/0379349 A1* | 12/2015 | Gomez | C23C 4/06 |
| | | | 348/78 |
| 2016/0313957 A1* | 10/2016 | Ebert | G06F 3/14 |
| 2017/0236332 A1* | 8/2017 | Kipman | G02B 27/0172 |
| | | | 345/633 |

\* cited by examiner

SYSTEMS AND METHODS FOR DETERMINING AN OBJECT THROUGH A DISAMBIGUATED SELECTION IN A MIXED REALITY INTERFACE

CROSS REFERENCE TO RELATED APPLICATIONS

This Patent Cooperation Treaty (PCT) application is related to and claims priority to U.S. Patent Application No. 62/398,579 filed Sep. 23, 2016, titled "SYSTEMS AND METHODS FOR RELATIVE REPRESENTATION OF SPATIAL OBJECTS AND DISAMBIGUATION IN AN INTERFACE," the entire contents of each are incorporated herein by reference for all purposes.

FIELD

Aspects of the present disclosure relate to an interactive user interface for a machine and more particularly to an interactive user interface providing representation and disambiguation of spatial objects relative to the machine's position

BACKGROUND

When traveling utilizing an autonomous of computing machine, including robots, aerial vehicles, aerospace vehicles, submersible vehicles, automobiles, other ground vehicles, and the like, users may often reference their surroundings when developing plans or requesting information about the world around them. However, it is often difficult to present requested information to the users of the autonomous machine in a manner that is intuitive to the users, i.e., presenting information of a three-dimensional space on a two-dimensional display. Also, oftentimes the indications of the users to reference objects in the world around the machine may be imprecise, especially as the machine is moving through the environment. Thus, it may be difficult to accurately determine what object within the world about which the user of the machine is attempting to receive information. It is with these observations in mind, among others, that various aspects of the present disclosure were conceived and developed.

SUMMARY

Implementations described and claimed herein address the foregoing problems by providing a method, system, and/or computing device for receiving a non-tactile selection through an input system of a real-world object in an external environment to the device, estimating an approximate geographic location of the device, and obtaining a subset of external real-world object indicators from a database of real-world objects that are located within the external environment for the estimated approximate geographic location of the device. The method, system, and/or computing device may also select at least one object from the subset of external real-world object indicators as a disambiguated selection based at least on the non-tactile selection and display a representation of the at least one object of the subset of external object indicators.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for interaction between a user and a machine, such as an autonomous machine. In general, a system is provided that receives an input from a user of a mobile machine, such as an autonomous vehicle or a mobile computing device, which indicates or describes an object in the world. In one example, the user may gesture to the object which is detected by a visual sensor. In another example, the user may verbally describe the object which is detected by an audio sensor. The system receiving the input may then determine which object near the location of the user that the user is indicating. Such a determination may include utilizing known objects near the geographic location of the user or the autonomous or mobile machine. In one particular embodiment, the system may disambiguate the user's input through accessing a database of previous selections or indications of objects in the area of the user, either globally or personally to the user.

In addition, the system may present an indication of the determined object to the user or users through a user interface of the mobile machine or device. In one particular embodiment, the indication of the determined object may be presented to spatially orient the determined object relative to the position of the user or device. A variety of examples of user interfaces to display the determined object relative to the position of the user or mobile machine are provided herein. In addition, the user interface may be updated periodically as the position of the user or mobile machine changes relative to the determined object. For example, the user interface may be included in an autonomous vehicle or semi-autonomous vehicle as the vehicle travels along a road or path. The user or passenger of the vehicle may indicate an object outside the vehicle to select the object. A user interface within the vehicle may provide an indication of the selected object to the passenger and, as the vehicle moves along the road, the representation of the selected object may be altered within the user interface.

In yet another embodiment, a plurality of objects may be displayed in the user interface. The disambiguation may be utilized by the system to select a "most likely" candidate based on the user input. However, other potentially selected objects may also be displayed in the user interface. In one embodiment, the potential objects may be ranked or displayed based on a calculated likelihood of selection or indication by the user. Further still, one or more of the displayed potential objects may be adjusted within the display based on a movement of the mobile device within the environment to maintain a spatial relationship between the displayed objects and the mobile machine or device.

Figure 1:
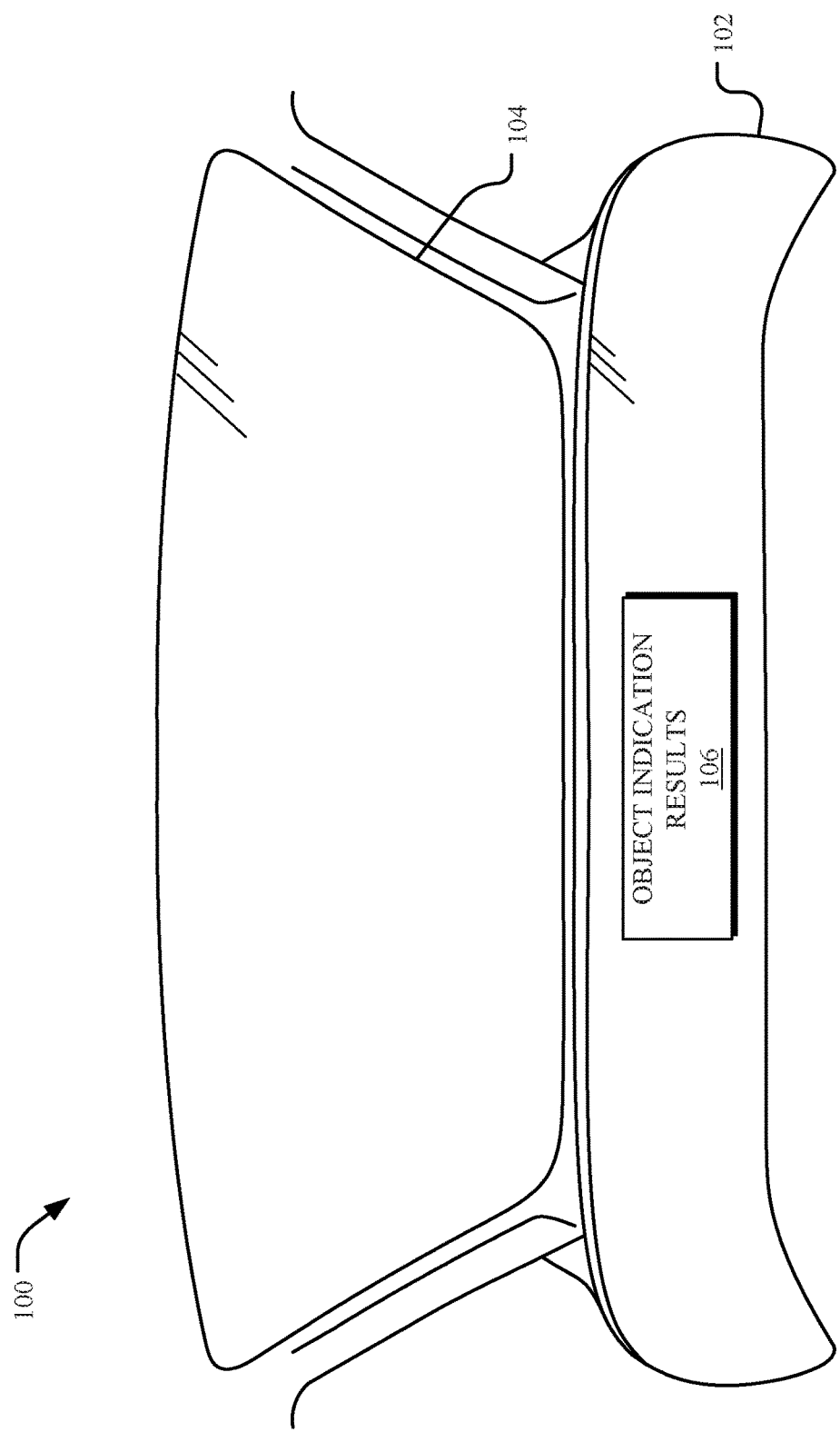
FIG. 1 is a diagram of an example system for providing representation of spatial objects relative to a machine in a user interface.

FIG. 1 is a diagram of an example system 100 for providing representation of spatial objects relative to a machine in a user interface. The system 100 includes a mobile machine or computing device 108. In one example, the mobile machine 108 is a mobile communication device, such as a cellular phone or tablet computing device. In another example, the mobile machine 108 may be an autonomous, semi-autonomous, or non-autonomous vehicle. In general, any type of computing device that may be moved through an environment may be included in the system 100 as the mobile machine.

The mobile device 108 may include a display 104 portion and/or an interactive portion 102. In the example where the mobile device 108 is a tablet computer or cellular phone, the display 104 portion may include a screen through which portions of the surrounding real-world environment may be viewed. In the example where the mobile device 108 is a vehicle, the display portion may include a windshield or other transparent portion through which a user or passenger of the vehicle may view the environment around the vehicle. In yet another example, the display portion 104 may be a non-transparent display device. As explained in more detail below, one or more indications of an object or objects within the environment around the mobile device 108 may be displayed on the display portion 104 such that a user of the system 100 may view the displayed indications. Thus, the display portion 104 may, in some instances, include an augmented reality display (ARD) or other type of augmented display system on which the indications are displayed while the user views the surrounding environment. In this manner, the displayed indicators of objects in the environment may be superimposed on a view of the environment or may be displayed separate from the environment itself.

In some instances, the display portion may be separate from and in communication with the mobile device 108. In the example where the mobile device or machine 108 is a vehicle, a communication may be provided to a separate mobile device, such as a cellular phone or tablet computing device, to display provided results on the mobile device. In this manner, a second device may be utilized as the display portion of the mobile machine 108.

The system mobile device 108 may also include an interactive portion 102 that receives inputs from a user of the device and/or provides one or more outputs to the user. In some instances, the results of a selection of an object in the environment around the mobile device 108 are presented in an object indication results 106 portion. In other embodiments, the results portion 106 may provide information concerning objects of the environment displayed in the display portion 104. For example, an object displayed in the display portion 104 may be of an office building near the mobile device 108. Several businesses may be located within the building and a listing of each or some of those businesses may be displayed in the results portion 106 of the interactive portion 102. In some instances, a user of the system 100 may interact with the provided results 106 to obtain more or less information concerning the displayed objects. Several examples of different types of displays of selected objects and related interactive procedures are described in greater detail below.

Figure 2:
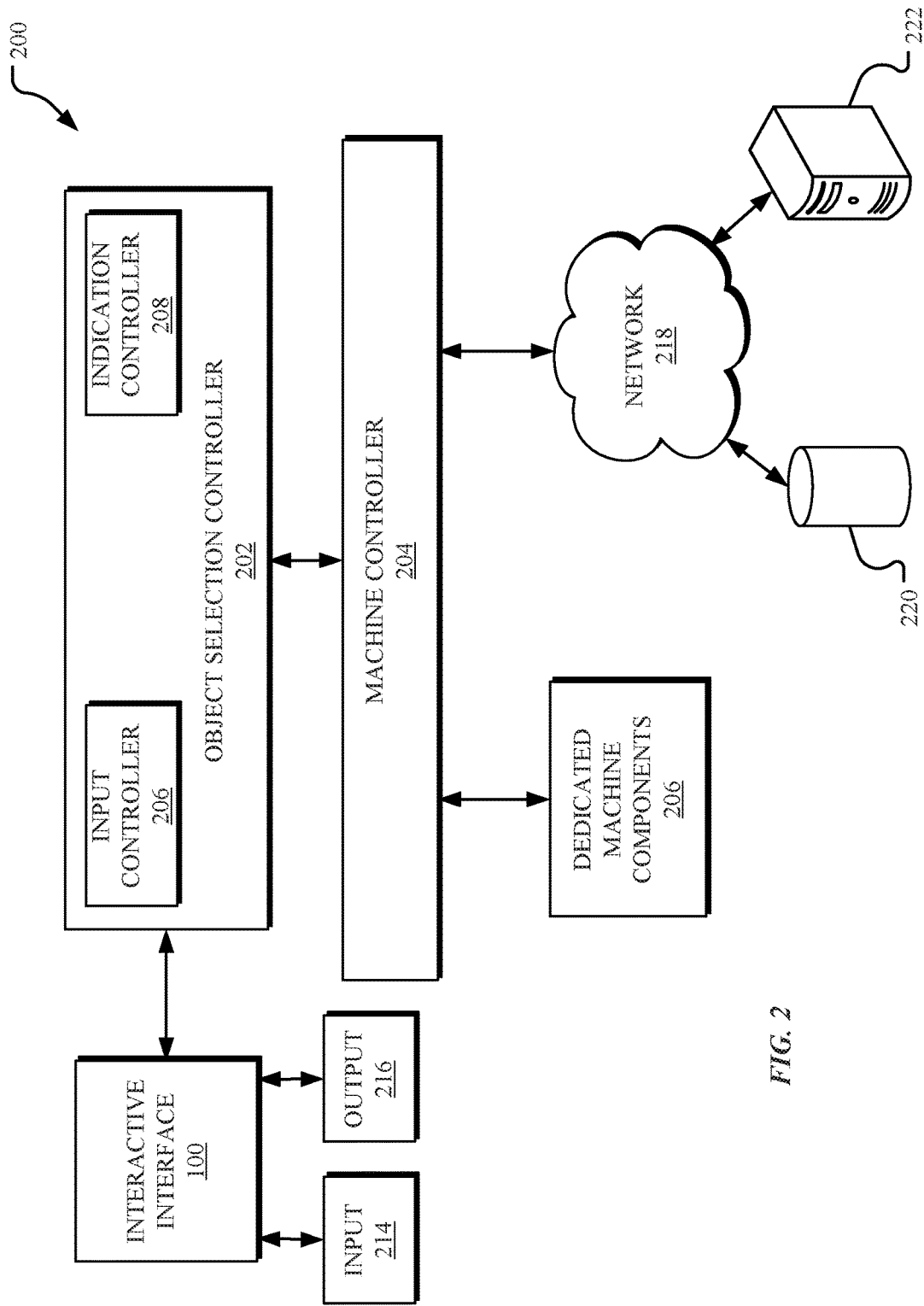
FIG. 2 illustrates an example system for generating the representation of spatial objects relative to a machine in a user interface.

Turning to FIG. 2, an example system 200 for generating one or more indications of a selected object in an environment on a mobile device 100 is shown. In one implementation, the system 200 includes an object selection controller 202 in communication with a plurality of dedicated machine components 206 over a machine controller 204. In one implementation, the machine controller 204 is a dedicated node system network where the object selection controller 202 and the dedicated machine components 206 communicate based on their own needs. For example, the machine controller 204 may utilize a publisher-subscriber architecture involving a messaging pattern where messages are published to the machine controller 204 and characterized into classes. The object selection controller 202 and each of the dedicated machine components 206 may subscribe to any of the classes to receive corresponding messages. Thus, the object selection controller 202 may receive machine status information and/or user status information without knowledge of what publishers, if any, exist. Similarly, the object selection controller 202 may publish messages to the machine controller 204 without knowledge of what subscribers, if any, exist. It will be appreciated that other architectures providing a communication channel for the object selection controller 202 and the dedicated machine components 206 may be deployed in the machine controller 204.

The object selection controller 202 is configured to generate the one or more indications of a selected object in an environment on a mobile device 100 based on machine status information and/or user status information obtained via the machine controller 204 or through the interactive interface 102. In one implementation, the object selection controller 202 includes an object indication controller 208 configured to generate the indications of the selected or determined objects in the display device 104 and an input controller 206 configured to receive an input from a user of the system 100 to select on object in the environment.

In one implementation, to permit interaction with the user and display the indicators of the objects, the dedicated machine components 206 register with the object selection controller 202. The dedicated machine components 206 are each responsible for one or more services for the mobile device or machine and/or in communication with one or more subsystems of the autonomous vehicle. For example, the dedicate machine components 206 may include navigation component(s), motion components, perception or sensor components, status components, environment components, and/or the like.

The machine controller 204 may further obtain machine status information, user status information, environment information and/or other raw or processed data over a network 218. In one implementation, the network 218 is used by one or more computing or data storage devices, including one or more databases 220, for remote interaction with the user interface. A server 222 may also host a website or an application that users visit to access information stored in the databases 220 and/or for remote interaction with the user interface. The server 222 may be one single server, a plurality of servers with each such server being a physical server or a virtual machine, or a collection of both physical servers and virtual machines. In another implementation, a cloud hosts one or more network components. The machine controller 204, the server 222, and other resources, such as the database 220 or user devices, connected to the network 218 may access one or more other servers for access to one or more websites, applications, web services interfaces, and/or the like for access to user status information, machine status information, and/or other services or information. The server 222 may also host a search engine for accessing and modifying such information.

To interact with the user via the user interface of the system 100, one or more input devices 214 and output devices 216 are employed. The input devices 214 may be generally any form of input device in communication (wired or wireless) with the object selection controller 202 and configured to capture raw data in the form of visual, audio, and/or tactile input. For example, the input devices 214 may include one or more sensors, user devices, and/or the like. The user device is generally any form of computing device, such as a computer, mobile device, smartphone, tablet, multimedia console, vehicle interface console, and/or the like. The sensors may include without limitation microphones, imagers, touchscreen sensors (e.g., resistive, surface acoustic, capacity, infrared (IR), optical, pressure, etc.) In one implementation, the input devices 214 project a signal, such as visible light, invisible light (e.g., IR light), acoustic waves, and/or the like, into a field of view. The signal is reflected from the field of view and detected by one or more sensors in the input devices 214. It will be appreciated that the input devices 214 and/or the primary interface controller 202 may employ various visual, audio, and tactile processing techniques to ingest input from the user captured by the input devices 214.

Similarly, the output devices 216 may be generally any form of output device in communication (wired or wireless) with the primary interface controller 202 and configured to provide visual, audio, and/or tactile output. The output devices 216 may include, without limitation, displays, projectors, speakers, light sources, haptic devices, user devices, and/or the like. In some implementations, the output devices 216 are integrated into components of the autonomous vehicle (e.g., in the seats, steering wheel, etc.).

In an example implementation, a user provides an input 214 to the system 200 through a physical gesture, a verbal description, a physical selection of the object on a display device, etc. of a real-world object in an environment. The input is provided to the input controller 206 of the object selection controller 202. As explained in more detail below, the object selection controller 202 may disambiguate the received user's indication of object through use of several other components of the system 200, such as the dedicated machine components 206, the server 222, the database 220, etc., accessed through the machine controller 204 component. Once the selection of the object is disambiguated, an indication controller 208 provides an indication of at least the selected object to the user on a display device 104. In one particular embodiment, the indication controller 208 may provide several potentially selected objects in the display device, as described in greater detail below. That is, the indication controller 208 may provide the indication of the object to the input controller 206 to display the object in the interactive interface 102 as an output 216 of the interface. In some embodiments, the indication controller 208 may receive location information for a mobile device (such as a vehicle) and adjust the display of the object or objects accordingly.

Figure 3:
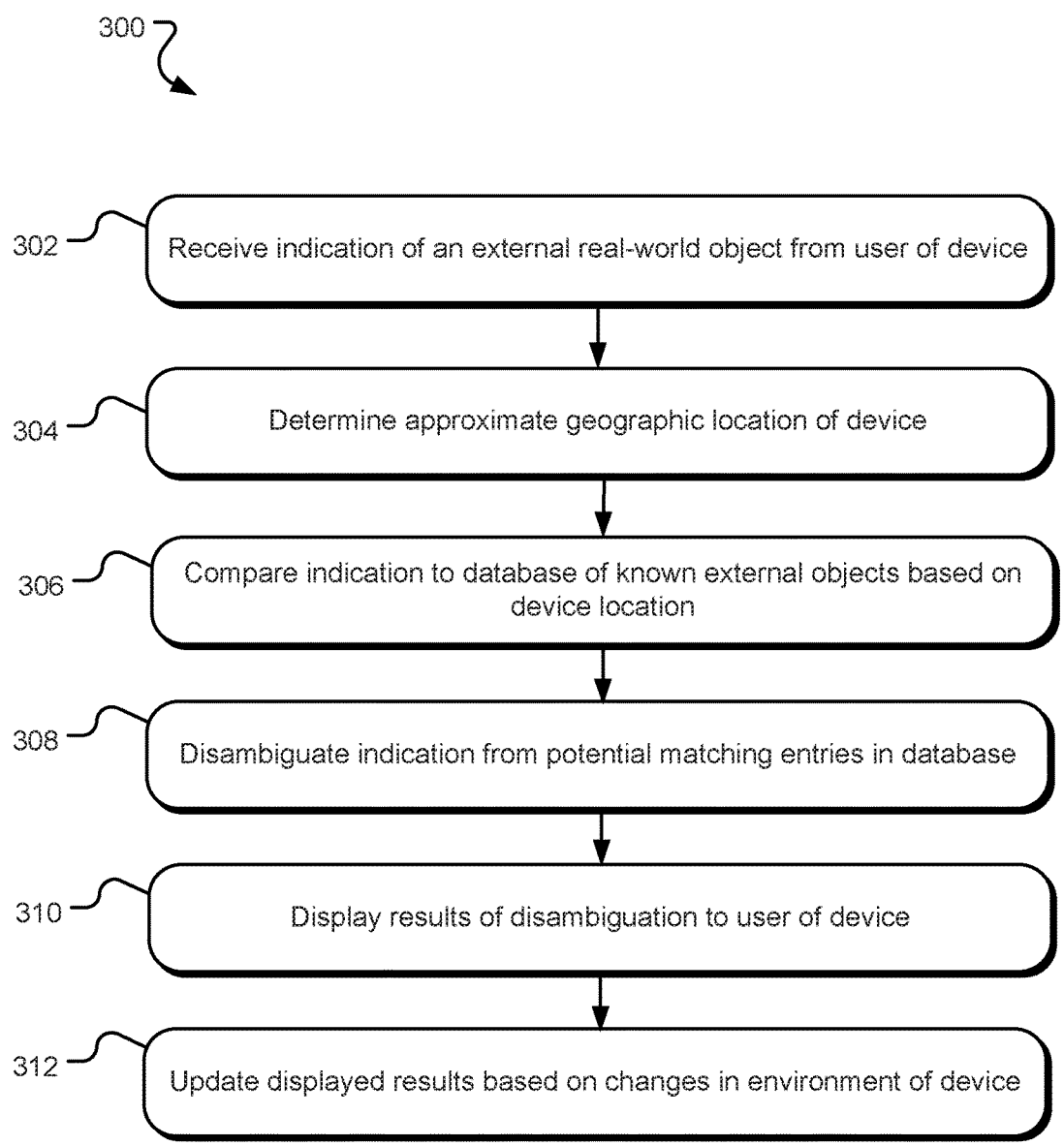
FIG. 3 illustrates a flowchart of a method for determining an object in a three-dimensional space and providing a representation of the object relative to a machine or user in a user interface.

FIG. 3 illustrates a flowchart of a method for determining an object in a three-dimensional space and providing a representation of the object relative to a machine or user in a user interface. In general, the operations of the method 300 of FIG. 3 are performed by the system 100 for providing representation of spatial objects relative to a machine in a user interface. Thus, one or more of the components illustrated in the system 200 may be utilized to perform the operations of the described method 300.

Beginning in operation 302, the system 100 receives an indication of a real-world object external to the mobile device 108 from a user of the device. For example, a user of the mobile device 108 may indicate a particular building in the environment around the mobile device. This indication may include a gesture made by the user in the direction of the building, such as pointing or waving at the building. In another example, the gesture may include gazing upon or in the general vicinity of the building to select or indicate the building. The gesture may be detected by a visual sensor, such as an infra-red camera or RGB camera, which obtains the movements or gazes of the user. In the example where the mobile device 108 is a vehicle, the visual sensor may be located within the vehicle and configured to detect movements or gazes of the passengers of the vehicle to an object that is external to the vehicle. A similar mechanism may be included in the mobile device 108 in the example where the mobile device is a tablet or other mobile computing device.

In another example, the input received from the user may be a verbal description of the intended object. In such an instance, an audio sensor may be included or otherwise connected to the mobile device 108 to receive the verbal description of the intended object. Further, the system 200 (such as the object selection controller 202) may include programs to determine the meanings of the descriptions of the external object. The disambiguation of the verbal descriptions in relation to the external objects to the mobile device 108 is described in more detail below.

Other inputs may also be received to indicate or select the external real-world object. For example, a view of the environment may be provided on a display that receives a touch input from the user. Thus, the user may touch the screen of the display to select an object. In another example, an input device (such as a mouse or stylus) may be used to provide the input to the display or system 200. In general, any known or hereafter developed device or system to provide an input to a computing device may be utilized in connection with selecting an object in an environment external to the mobile device 108.

In operation 304, the system 200 determines an approximate geographic location of the mobile device 108. For example, the mobile device 108 may be a mobile computer or cellular phone that includes Global Positioning System (GPS) capabilities to determine an estimated geographic location of the device. Similarly, a vehicle may include a GPS or other localization capabilities to determine the mobile devices location. With the estimated location, the mobile device 108 may compare the received indication of an external object to a database of known objects in the vicinity or near the estimated location of the device 108 in operation 306. For example, a vehicle may be traveling through a particular intersection of known roads. Objects, such as buildings, offices, bus stops, traffic lights, etc., in the intersection may be categorized and stored in a database, such as database 220 accessible through network 218. Such a collection of objects may be obtained and stored for any number of locations around the globe in database 220 or any number of databases accessible by the mobile device 108. The mobile device 108 may, in turn, access the object database 220 to retrieve known objects in the estimated location of the mobile device, either prior to or after receiving the input from the user. The comparison of the received input to the database of known objects in the external environment of the mobile device 108 may include a disambiguation operation to further refine or determine which of the known objects the user is selecting in operation 308.

In particular, the system 200 may compare the received input from the user of the mobile device 108 to one or more indicators of real-world objects stored in the database 220 for the estimated device location. For example, the input received may include a gesture or gaze of the user towards a location external to the mobile device 108. Through an analysis of the location of the vehicle, an orientation of the gesture, and an estimated location of one or more real-world objects within the environment, the system 200 may determine a "best-fit" object for the received gesture. In other words, the system 200 may determine a line of sight or destination of a gesture and compare the intended direction of the gesture to a known location of one or more objects in the environment. Through this analysis, the system 200 may then predict or select an object in the environment as the object the user of the system 200 is referencing or selecting.

In another example described above, the user of the system 200 may provide a verbal description of the object the user references in the environment. For example, the user may ask the system for more information about "the red building", "the tall mountain", "the nearest bank or ATM", "that coffee shop", etc. In general, the user may use any description to select an object in an environment external to the mobile device 108 to learn more information about the object. The system 200 may receive the verbal description of the object and utilize one or more Voice Recognition (VR) techniques to determine what was said by the user. In general, any known or hereafter developed VR techniques to understand a verbal description of an object or location may be utilized by the system 200 to determine or estimate an object selected by the user within the environment.

With the verbal description of the object determined, the system 200 may compare the received description to a database 220 of known or stored real-world object indicators based on the estimated geographic location of the mobile device 108. For example, the user may ask the mobile device 108 for information about a local coffee shop the user views in the external environment to the mobile device. The system 200 may then determine an estimated location of the mobile device, access the database 220 of object indicators or locations, and determine if a coffee shop is located in the vicinity of the mobile device. In one embodiment where more than one coffee shop may be in the vicinity of the mobile device, the system 200 may utilize other inputs from the user (such as a gesture or direction of gaze) detected from other sensors (such as a visual sensor) to determine which of the multiple coffee shops the user intends to learn about. Thus, in another example, the system 200 may determine that the user uttered the words "red" and "building" during a description of the object. With these description words determined, the system 200 may analyze the stored object indicators in the database 220 for the geographic location of the mobile device 108 for a red building and select that object as the object indicated by the user's description.

In this manner, the system 200 may attempt to determine which object in the external environment the user is gesturing to, describing, or otherwise selecting. This process may otherwise be known or referred to as "disambiguating" the user's input. As mentioned above, the inputs received from users of the mobile device or system 108 may not clearly select or describe the intended object in the environment. Further, some users may use particular description words while other users may use different description words. Thus, the system 200 may utilize one or more techniques to disambiguate the received input from the user to better select the object in the environment, such as utilizing several sensors to determine the user's intent or to limit the number of objects considered in the vicinity of the mobile device 108. Other methods and techniques to disambiguate a particular object the user is indicating in the external environment to the mobile device 108 are discussed in more detail below. Regardless of the technique utilized by the system 200, a best-fit or several best-fit objects in the environment of the mobile device 108 are selected by the system for presenting or displaying to the user.

In operation 310, the system 200 displays the results obtained from the operations above. In general, the system 200 displays a best-fit result to the user based on the user's input and the disambiguation of the input. The result may include an indicator of the determined object and/or information concerning the object. For buildings or other such objects, information may include, but is not limited to, business names associated with the building or location, phone numbers, addresses, building size, a building name, etc. For natural objects, such as a mountain, the information may include the name of the mountain, an elevation of the mountain, and other information specific to the selected object. In general, any information may be provided or displayed to the user of the determined selected object.

In addition, the presentation of the object to the user may be provided in a manner that spatially orients the object relative to the user or mobile device location. Several examples of spatially orienting objects in an environment to a user or mobile device location through a user interface are provided below with reference to FIGS. 4-10. Such indicators may be provided to the user through any type of display device or user interface. Further, as the mobile device 108 moves through the environment, the orientation and location of the mobile device in relation to the displayed objects may change. For example, an object selected by a user on a corner of an intersection may initially be displayed by the system 200 as described. However, as the vehicle or other mobile device 108 moves through the intersection and continues along a path, the location of the selected object changes in relation to the location of the vehicle. Thus, in operation 312, the system 200 may alter the displayed results based on the movements of the mobile device 108. In particular, the system 200 may continually or periodically update the estimated location of the mobile device 108 as the device moves through the environment. With each location update, the displayed results may be altered to reflect the new spatial relationship between the mobile device and the selected objects. Further, more objects may be selected by the user at a later time. These additional objects may also be displayed to the user by the system 200. In this manner, the displayed results by the system 200 may be updated to reflect changes in the position and/or orientation of the mobile device 108 to further provide a spatial representation of the selected object to the mobile device.

FIGS. 4-10 illustrate various examples of the display or user interface 400 through which interactions with the machine and related machine status information and user status information are provided. It will be appreciated by those skilled in the art that such depictions are exemplary only and not intended to be limiting. In general, each of the user interfaces illustrated in FIGS. 4-10 are provided in relation to the system 100 of FIG. 1. Thus, each illustration includes a mobile device 108 (such as a tablet computing device or a vehicle) that includes a display portion 104 and an interactive portion 102. In the example where the mobile device 108 is a vehicle, the display portion 104 may include a windshield or other transparent material through which a user of the vehicle may view the external environment. The user or users of the mobile devices illustrated may interact with several aspects of the user interfaces, as explained in more detail below.

Figure 4:
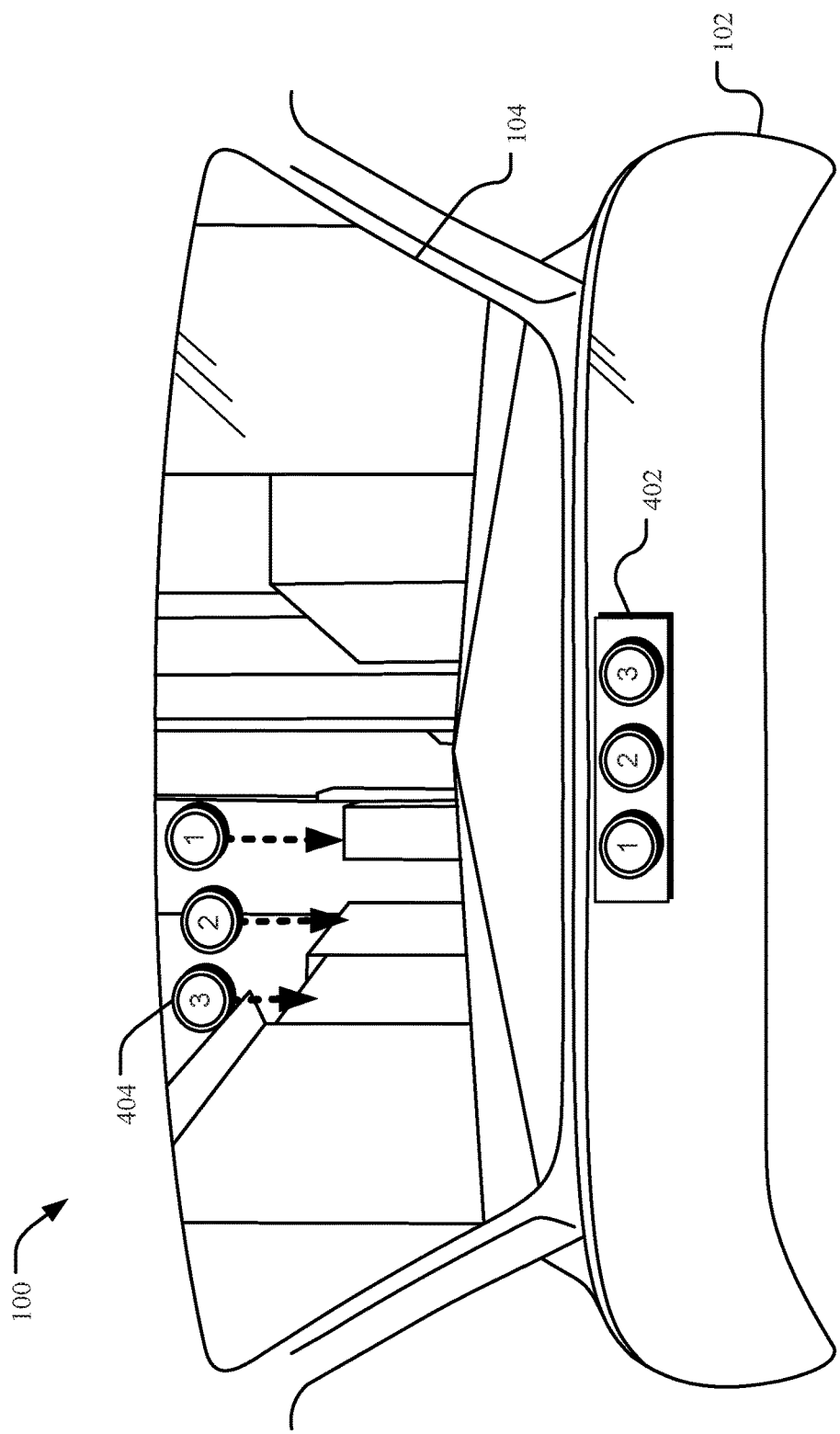
FIG. 4 illustrates a first embodiment for displaying a representation of spatial objects relative to a machine in a user interface.

FIG. 4 illustrates a first embodiment 400 for displaying a representation of spatial objects relative to a machine in a user interface. In this example, the external environment is visible through the display portion 104. Thus, the display portion 104 may include a windshield of a vehicle or a view of a camera associated with a mobile computing device. Through the method 300 described above, a user of the mobile device 108 may indicate an object in the external environment. The system 200 may determine a "best-fit" object in the environment selected by the user. Other objects that the user may have also indicated may also be displayed in the display portion 104. Thus, the system 200 may display a list of several objects that the user may have selected to provide the user with information for more than one potential match to the user's input. As shown in FIG. 4, the system 200 may superimpose an indicator 406 of the determined object within the display portion 104 over the external environment. In one example, the indicator 406 may be visible through an ARD worn by the viewer or user that operates in conjunction with the system 200.

In the embodiment 400 illustrated in FIG. 4, three indicators 406 of objects in the external environment are displayed in the display portion 104 of the mobile device 108. Although shown as a circle with an arrow pointing to the determined object, it should be appreciated that any type and shape of indicators 406 may be used. The indicators 406 may be displayed in response to a user providing an input to the system 200. For example, the user may point at the objects in the environment to obtain information about the objects. The system 200 may interpret the pointing and select an object in the environment as the object of interest for the user. The system 200 may also provide other possible objects as the object of interest. In this manner, a ranking of potential objects of interest may be displayed in the display 108, illustrated as rankings 1-3. Information about the selected objects may also be provided in an interactive portion 402 of the mobile device 108. In one embodiment, a user may provide additional inputs to the system 200 (such as pressing a part of the interactive portion 402) to obtain more information about the selected object. The information provided to the user by the interactive portion 402 may be displayed in the display portion 108 or on any other surface of the mobile device 108. Through this interface 400, a user may indicate an object in the vicinity of the mobile device 108, be provided with one or more indicators 406 of the indicated objects, and select or be provided with information about the selected objects within a display of the mobile device.

In another embodiment, the user may provide a verbal description of the objects. For example, the user may describe "a building ahead on the left". In response, the system 200 may select the potential objects intended by the user and provide the selected objects in the display 104, as shown. Similar to above, the indicators 406 may include a ranking of potential objects based on the user's description. Regardless of the type of input received, the system 200 displays indicators 406 of the determined objects and, in some instances, provides additional information concerning the selected objects to the user through an interactive portion 402 or in the display itself. As such, the user may interact with the external environment of the mobile device 108 to obtain information concerning one or more objects in the environment.

Figure 5:
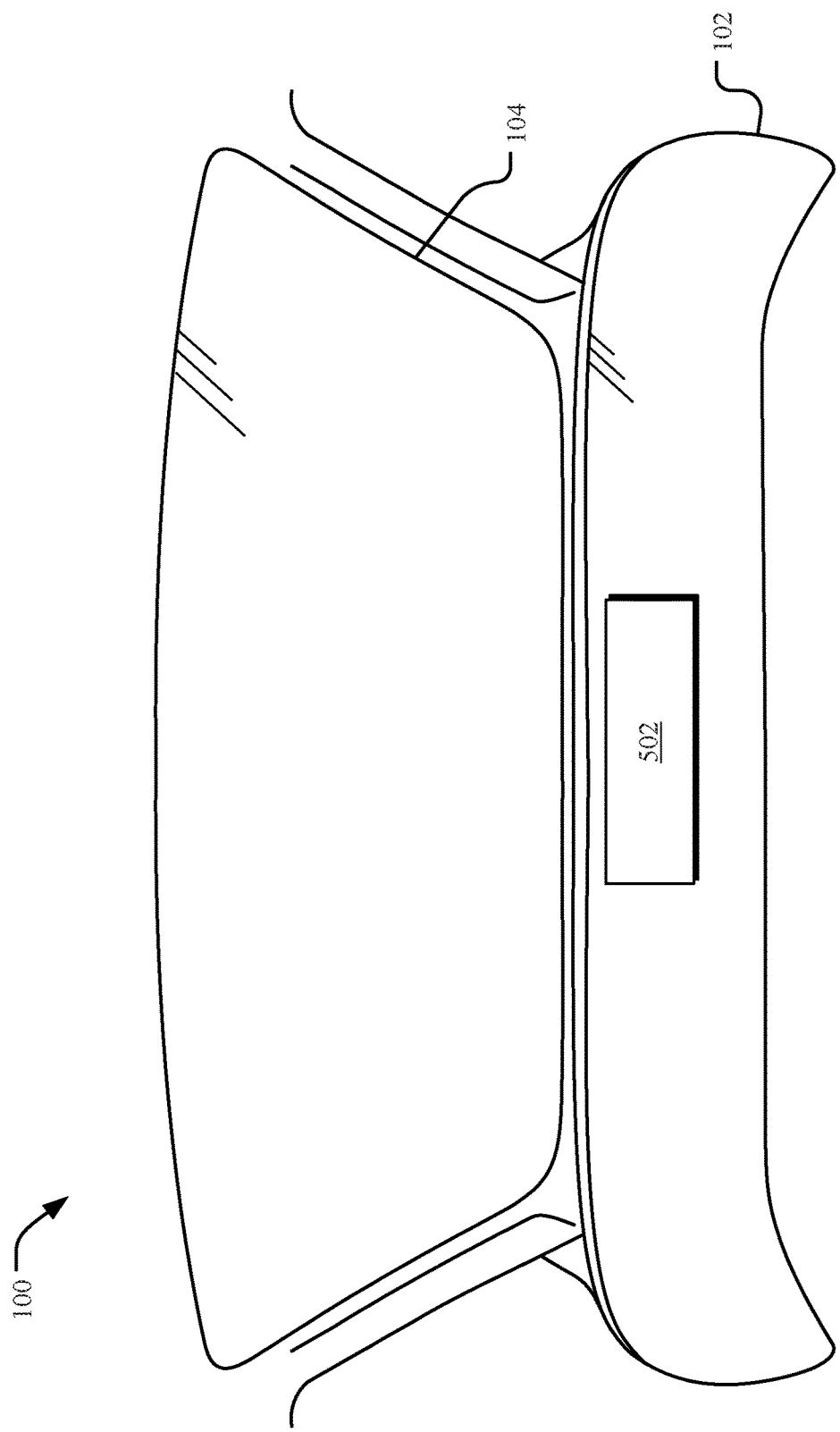
FIG. 5 illustrates a second embodiment for displaying a representation of spatial objects relative to a machine in a user interface.

FIG. 5 illustrates a second embodiment 500 for displaying a representation of spatial objects relative to a machine in a user interface. In this embodiment 500, a visual display of the selected objects is not provided in the display portion 104 of the mobile device 108. Rather, the display of the objects is provided in the object indication results area 506 of the interactive portion 102 of the mobile device 108. As such, the results displayed by the system may be provided in the display portion 104 or the interactive portion 102, or both in some instances. This embodiment 500 may be utilized in vehicles to prevent indicators from being projected onto a windshield during operation of a vehicle.

Figure 6:
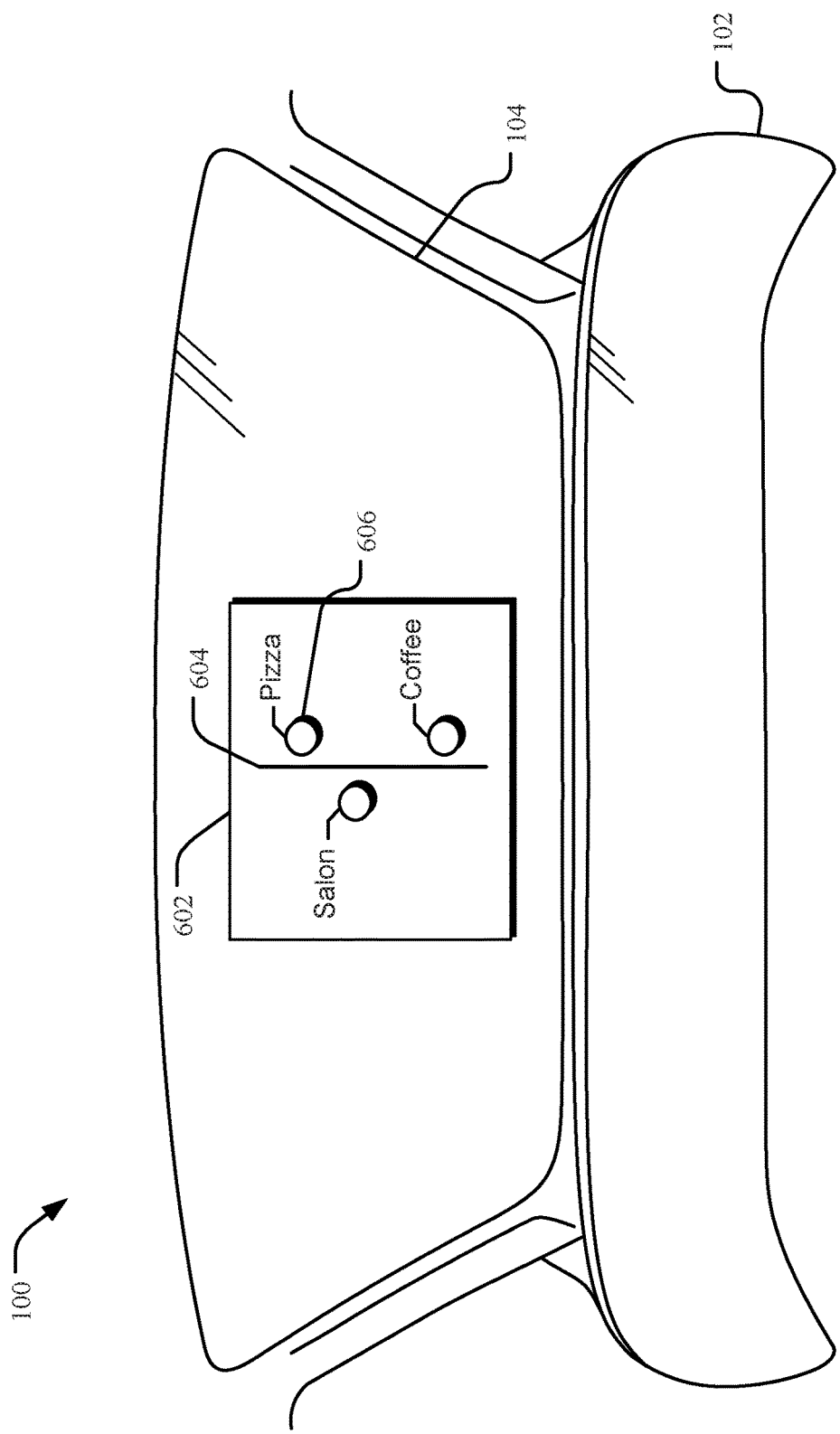
FIG. 6 illustrates a third embodiment for displaying a representation of spatial objects relative to a machine in a user interface.

FIG. 6 illustrates a third embodiment 600 for displaying a representation of spatial objects relative to a machine in a user interface. In this embodiment 600, a visual representation of the external environment 602 is provided in the display 104. The visual representation 602 may include one or more indicators 606 of the determined objects. Further, the visual representation 602 may include a road or path indicator 604 near the center of the representation. The road indicator 604 is provided to orient the selected objects 606 in relation to the position of the user/mobile device 108. For example, as the mobile device is traveling down a path or road, selected objects may be located on the right-hand side or left-hand side of the road. The inclusion of the road indicator 604 in the visual representation of the external environment 602 provides an indication of which side of the road the selected objects are located in relation to the position of the mobile device 108. Further, information 608 about the selected or provided objects may also be included in the visual representation 602. In other embodiments, the information or additional information of the selected objects may be displayed in the object indication results 106 area of the mobile device 108.

Figure 7:
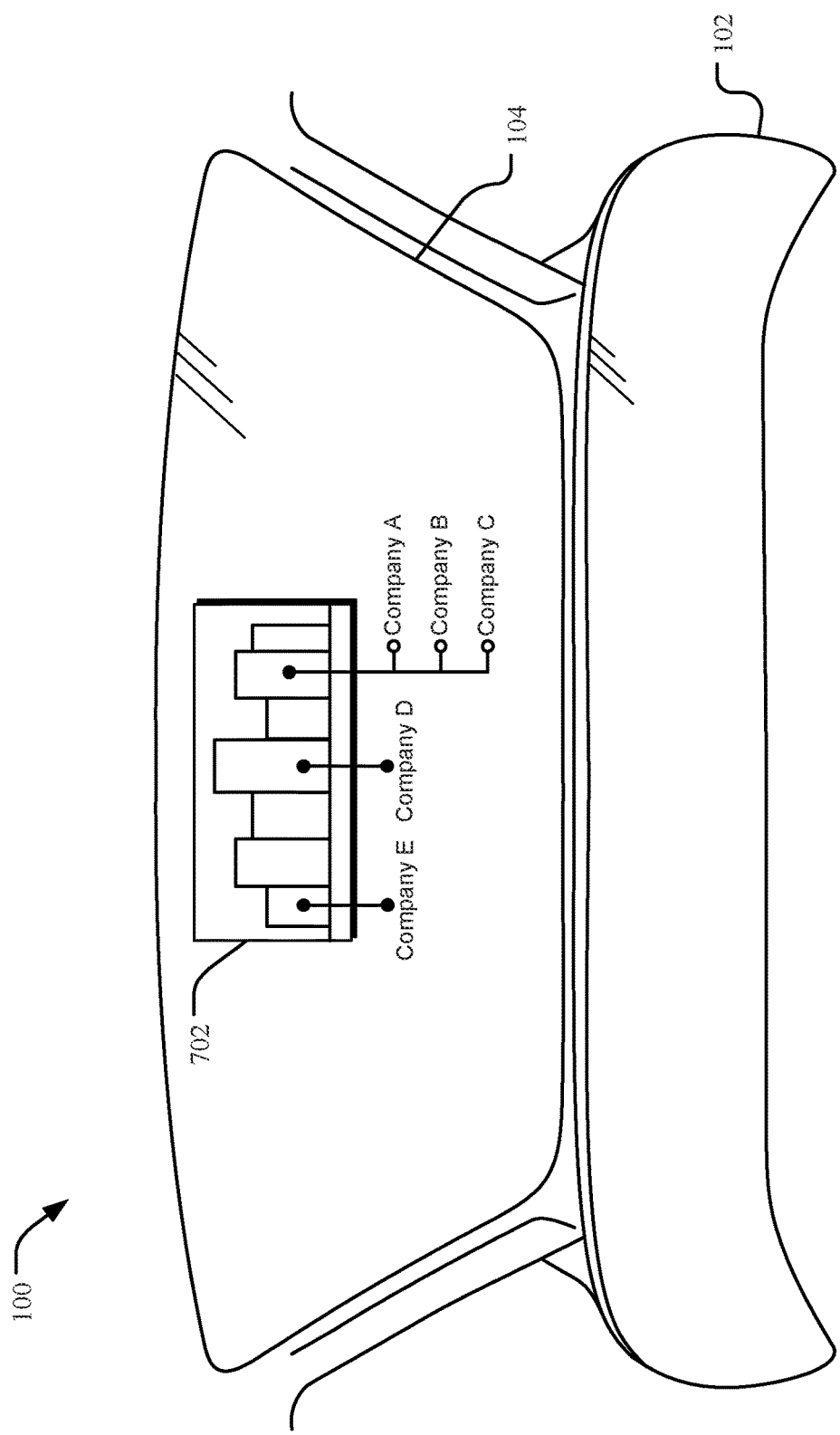
FIG. 7 illustrates a fourth embodiment for displaying a representation of spatial objects relative to a machine in a user interface.

FIG. 7 illustrates a fourth embodiment 700 for displaying a representation of spatial objects relative to a machine in a user interface. In this embodiment 700, a visual representation of the external environment 702 is provided in the display 104. In one example, the visual representation 702 illustrates one side of a vehicle when the vehicle is the mobile device 108. The visual representation may be, in one embodiment, a photograph or image of the external environment. In another embodiment, the visual representation 702 may be a created image of the external environment. As shown in FIG. 7, the visual representation 702 includes buildings located on one side of the vehicle. In addition, the visual representation 702 may include one or more indicators 706 of the determined objects. In particular, the one or more buildings determines as objects potentially selected by the user may be illustrated. Other non-selected buildings may be also be illustrated or shown. That is, the selected objects 706 may be illustrated or shown in the visual representation 702 in relation to other non-objects. Further, the visual representation 702 may include information 708 about the selected or provided objects. In the example shown, the information 708 takes the form of a drop-down listing of the companies or businesses associated with the selected objects 706 in the visual representation 702. Buildings with multiple businesses located within the building may be listed, and in some instances, may include a floor number associated with the business location within the building. In other embodiments, the information or additional information of the selected objects may be displayed in the object indication results 106 area of the mobile device 108.

Figure 8:
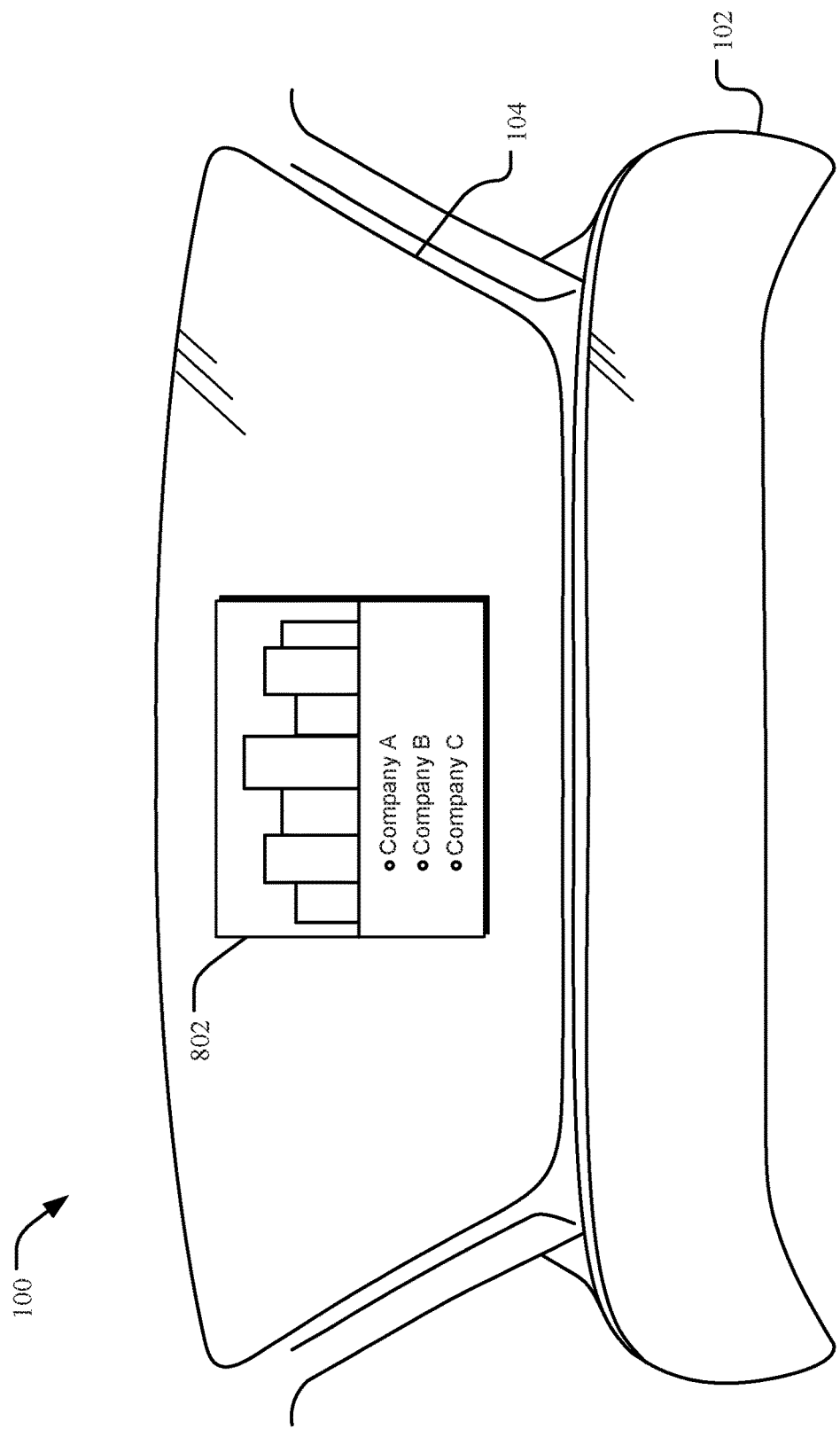
FIG. 8 illustrates a fifth embodiment for displaying a representation of spatial objects relative to a machine in a user interface.

FIG. 8 illustrates a fifth embodiment 800 for displaying a representation of spatial objects relative to a machine in a user interface. The embodiment 800 of FIG. 7 is similar to that of FIG. 7. However, in the visual representation 802 of FIG. 8, the information 808 is provided in a list form and not necessarily tied to a particular illustrated or shown building. Additional information for each listed object may also be included in the display portion 104.

Figure 9:
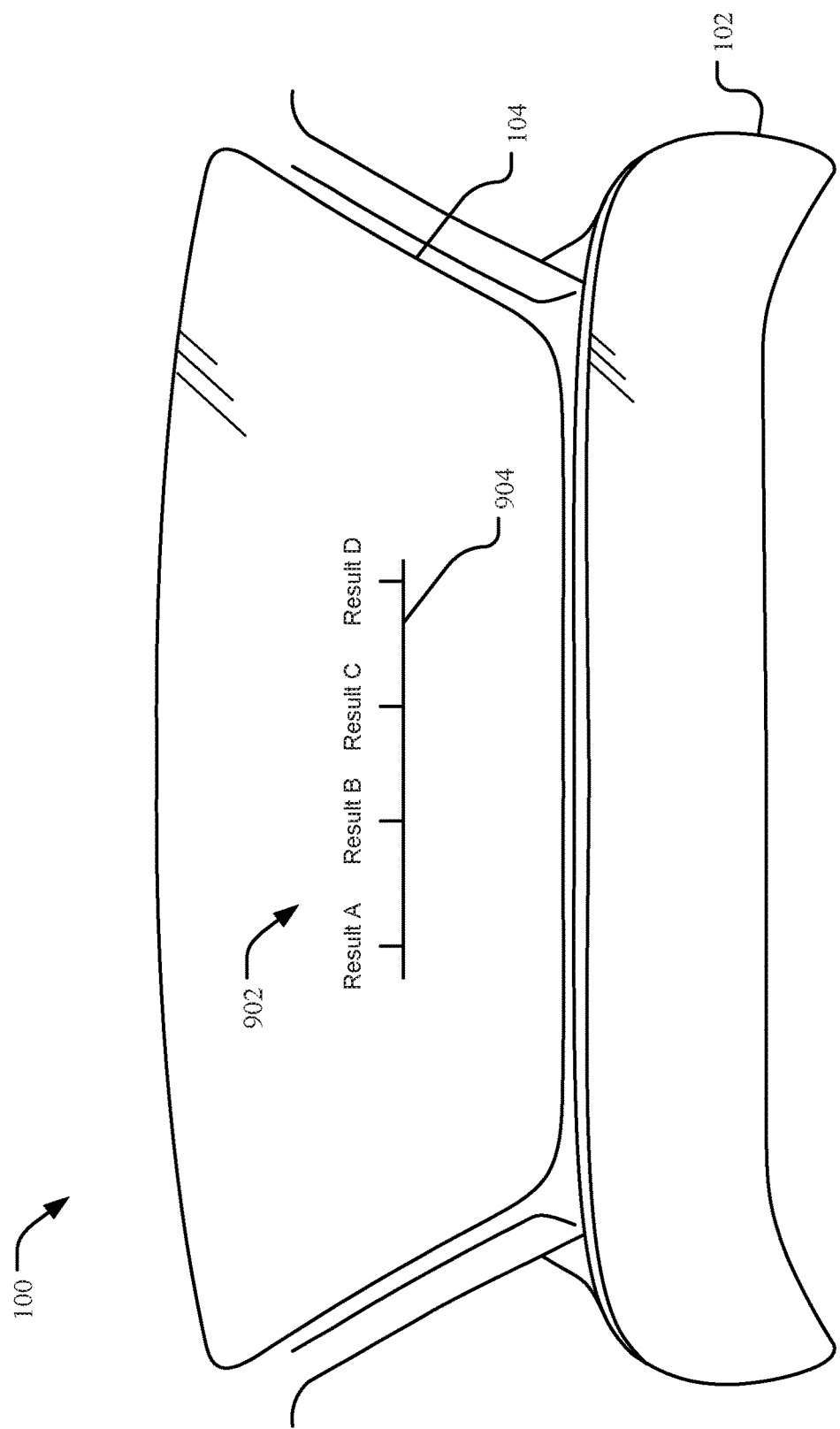
FIG. 9 illustrates a sixth embodiment for displaying a representation of spatial objects relative to a machine in a user interface.

FIG. 9 is a sixth embodiment 900 for displaying a representation of spatial objects relative to a machine in a user interface. In this embodiment 900, the selected objects are displayed along a timeline 904. In a similar manner, the corresponding information for the selected objects may also be provided along the timeline 904 or in an interactive portion 1022 of the mobile device 108. In one embodiment, the location along the timeline 904 may correspond to the location of the selected objects to the user or the mobile device 108. For example, the closest result may be located on the far right of the timeline 904 while the furthest object from the mobile device 108 may be located on the far left of the timeline. In general, however, the location of the selected objects on the timeline 904 may be based on any information concerning the selected objects, such as the object location and/or the likelihood of the selected object being the particular object indicated by the user input.

Figure 10:
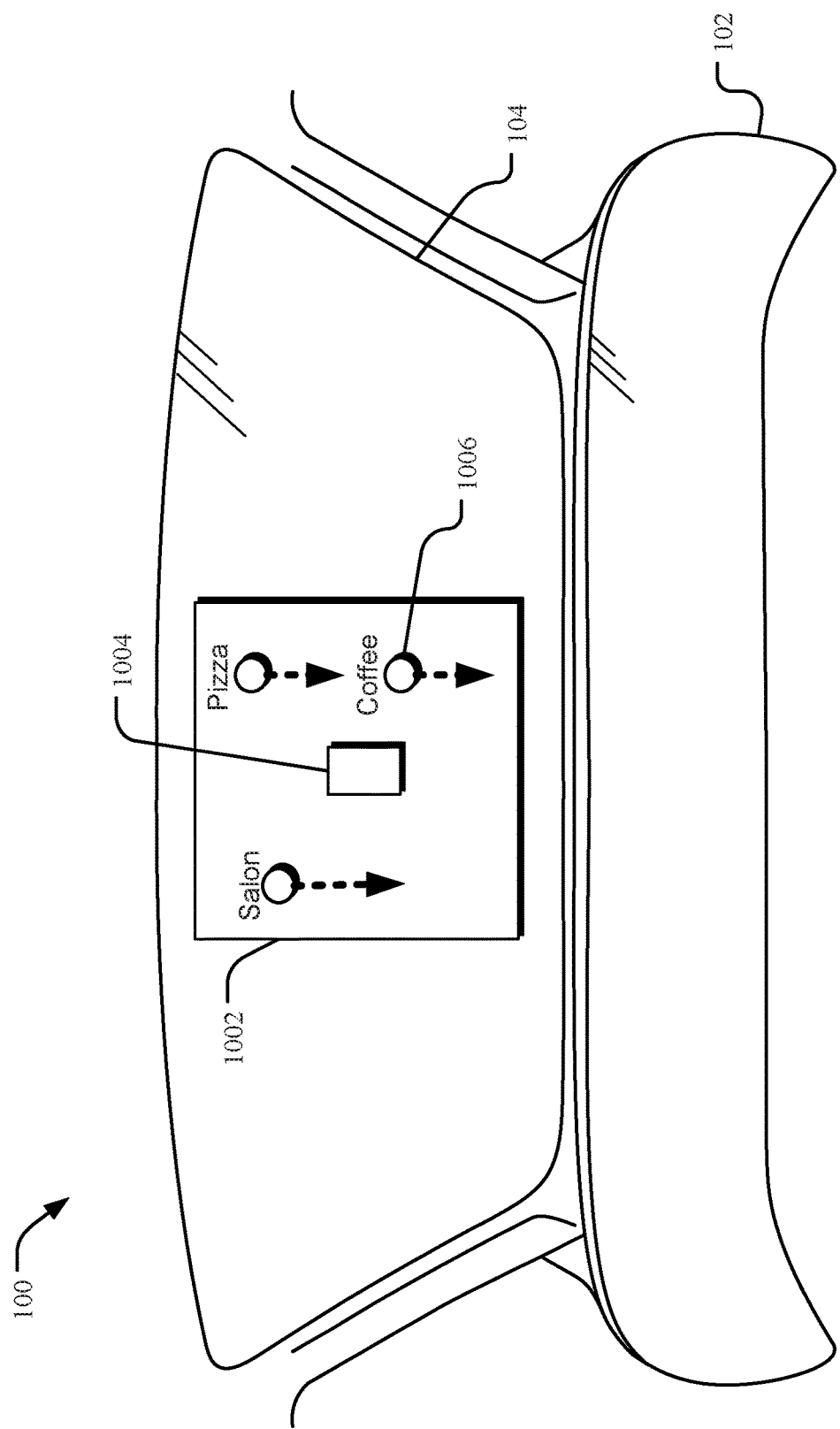
FIG. 10 illustrates an embodiment for altering a displayed representation of spatial objects relative to a machine in a user interface as a mobile device moves through an environment.

As mentioned above, the displayed results may be adjusted or altered as a mobile device 108 or user moves through the environment. For example, FIG. 10 illustrates an embodiment 1000 for altering a displayed representation of spatial objects relative to a machine in a user interface as a mobile device moves through an environment. The illustration 1000 in FIG. 10 is similar to that illustrated in FIG. 6 and includes one or more object indicators 1006. In this embodiment, however, a representation of the mobile device 1004 is shown in the visual representation 1002. Further, as the mobile device moves through the environment, the relative position of the mobile device 108 to the selected objects 1006 may change. This change in relative position between the mobile device 1004 and the represented objects 1006 may also be illustrated in the visual representation 1002. In particular, as the mobile device 108 moves, the position of the object indicators 1006 may move within the visual representation 1002, such as moving toward the bottom of the representation (as indicated by the movement arrows pointing down). However, it should be appreciated that the object indicators 1006 may be moved around the visual representation 1002 in any direction or manner to illustrate the change in relative position between the mobile device 1004 and the objects.

In a similar manner, the object indicators in other embodiments may also be altered as the mobile device 108 moves through the environment. For example, the object indicators 406 of FIG. 4 may be moved within the display portion 104 to remain pointing to the selected objects. In embodiments 700, 800, and 900 of the visual representation, the object indicators may move to the left or right within the visual representations to illustrate the change in relative position between the mobile device 108 and the objects. The movement of the indicators may be determined by the system 200 through a calculation of an estimated location of the mobile device 108 and the location of the selected objects. In one implementation, the location of the mobile device 108 is determined through a GPS device and the location of the objects is obtained from a database 220 of known object locations. Through the alteration of the display of the selected objects, the user of the system 200 may obtain a spatial understanding of the location of the selected objects in relation to the location of the mobile device 108.

Figure 11:
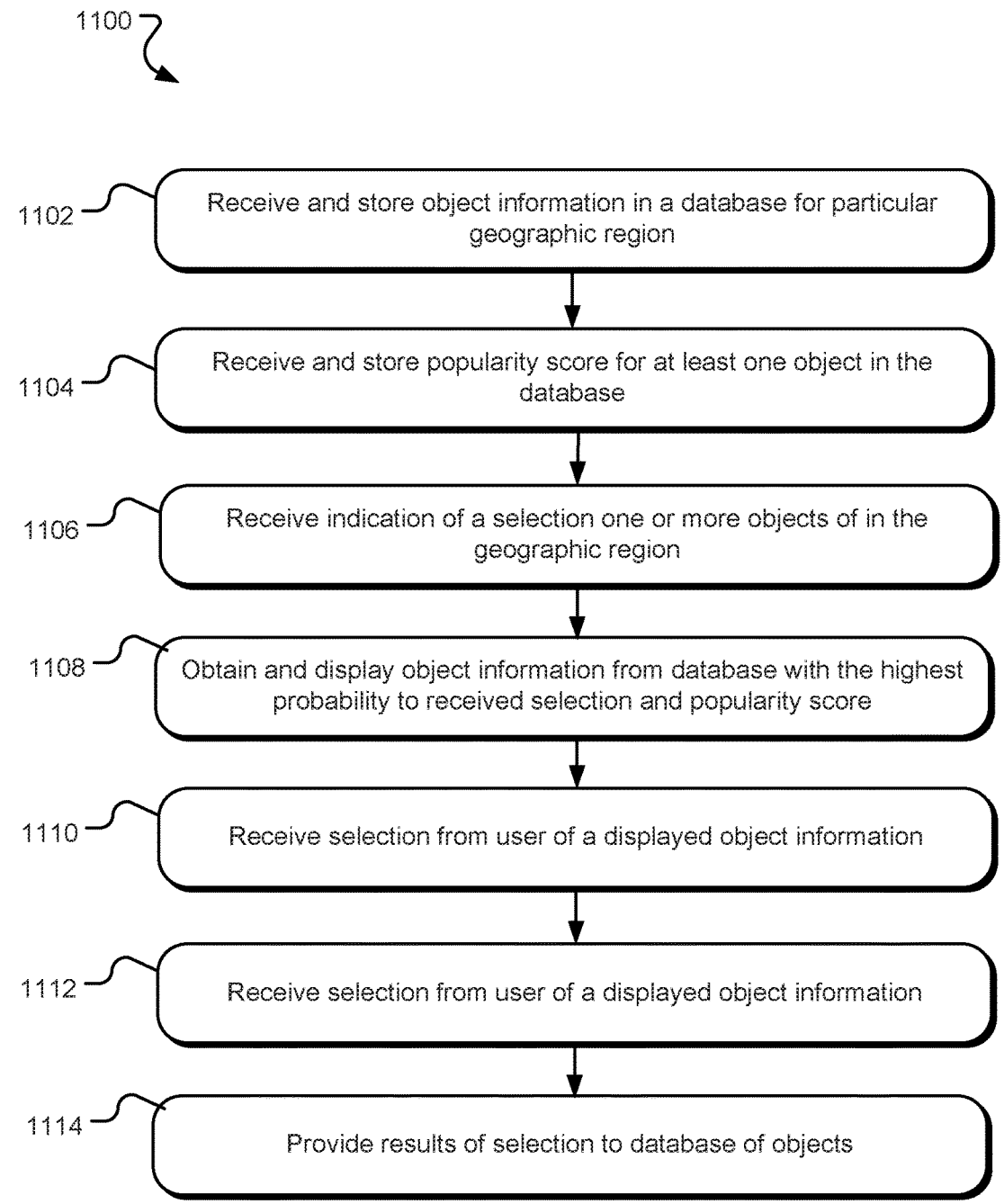
FIG. 11 illustrates a flowchart of a method for disambiguating a selection of an object based on stored information of an environment.

To aid the system 200 in disambiguating the input of the objects from the user, one implementation of the system may utilize one or more machine learning techniques or past selections to determine which object is selected by the user. In particular, FIG. 11 illustrates a flowchart of a method 1100 for disambiguating a selection of an object based on stored information of an environment. The operations of the method 1100 may be performed by one or more of the components of the system 200 discussed above in relation to FIG. 2. Through the operations described, the system 200 may further disambiguate an input received from a user of a mobile device 108 to select or indicate an object in an external environment to the mobile device.

Beginning in operation 1102, the system 200 receives information pertaining to objects located in a particular geographic location and stores the object information in a database 220. In one embodiment, the database 220 is available over a network 218 for multiple mobile devices to obtain or otherwise access the stored information. The information stored in the database 220 may be received from any number of data collectors. For example, the database 220 may be a portion of a central server computing system. By communicating with the central server through the network 218, any number of mobile machines or devices may obtain the stored information. Further, the information stored in the database 220 may be provided by any number of data collectors. In this manner, a fleet of data collectors and other data sources may provide the information to the database 220 for storage, with each segment of information corresponding to a geographic region. In one particular implementation, the information is stored and categorized in the database 220 based on the estimated geographic location of the object to which the information pertains. The information once stored is then available for mobile devices, such as autonomous vehicles, for use in determining and displaying the information on objects in an environment of the mobile device. In general, the object information includes an estimated geographic location of the object and identifying information concerning aspects of the object.

In a similar manner and in operation 1104, the system 200 receives and stores a popularity score or indicator about one or more objects stored in the database 220. In general, the popularity score associated with an object provides an indication of the likelihood that an object is popular with the general public. For example, it is more likely that a user of a mobile device 108 may be interested in the location and information of a restaurant than a law firm located within a building. Thus, those objects that may be of public interest or have large volumes of patrons may have a higher popularity score than other objects of less interest. The popularity scores of the objects in the database 220 may be provided by any data source or collector.

In operation 1106, the system 200 receives an indication of a selection of a particular object stored in the database 220 for the geographic region. In other words, the system 200 may receive an input from a user of an object in the external environment of the mobile device 108, as described above. As also described above, the system 200 may obtain and display object information and/or indicators from the database 220 to the user in operation 1108. In one implementation, the displayed object information may be based on a probability that the selected object was indicated by the user's input and/or the popularity score of the object. For example, the user may indicate a coffee shop in the environment of the mobile device 108. Through an analysis of the user's input and a popularity score associated with objects in the geographic region of the mobile device 108, a particular coffee shop may be presented as the selected object to the user. Other objects may also be presented in descending order of probability of the intended object of the user. In this manner, the system 200 attempts to determine which object in the environment the user intended to select or gestured toward. This disambiguation of the user's input may include an analysis of the received input and, in some cases, the popularity of the particular object.

In some instances, the objects in the database 220 may have more than one popularity score or indication. For example, a bookstore may have a first popularity score based on the overall number of users that select the bookstore over a period of time. However, the bookstore may also have a second popularity score based on the number of selections of the object when intending to obtain information about all bookstores in the area. In other words, objects in the database 220 may have a general popularity and/or an object-type specific popularity score. In general, any number and types of popularity scores may be associated with the objects stored in the database 220.

As also mentioned above, the system 200 may receive an indication or selection of one particular object from a plurality of object indicators provided to the user. For example, the system 200 may display a plurality of object options that align with the user's input. The user, in turn, may select one of the options in the display or interactive portion to obtain additional information about the selected object. In operation 1110, the system 200 may receive the selection of the intended object from the user. This selection may indicate to the system 200 the accuracy of the provided objects to the user based on the user's input and popularity score. In other words, the selection of one of the object possibilities provided to the user indicates how accurate the system 200 was in predicting the object indicated by the user's input. In addition, the system 200 may utilize the selection information to adjust the information stored in the database 220. For example, the popularity score associated with an object in a globally-available database 220 may be adjusted as more and more users of the various mobile devices 108 select a particular object. In another example, the system 200 may maintain a local database of favorites or often-selected objects of a user or users of the particular system. These favorites of the user may be given preference over other objects when the system 200 receives an input suggesting the favorite object. In this manner, the information stored in a database may be adjusted as certain objects are selected by many users or a particular user. This information may then be utilized by the system 200 at a later time to further disambiguate a user's input and provide a particular object to the user as being the selected object based on the input.

Figure 12:
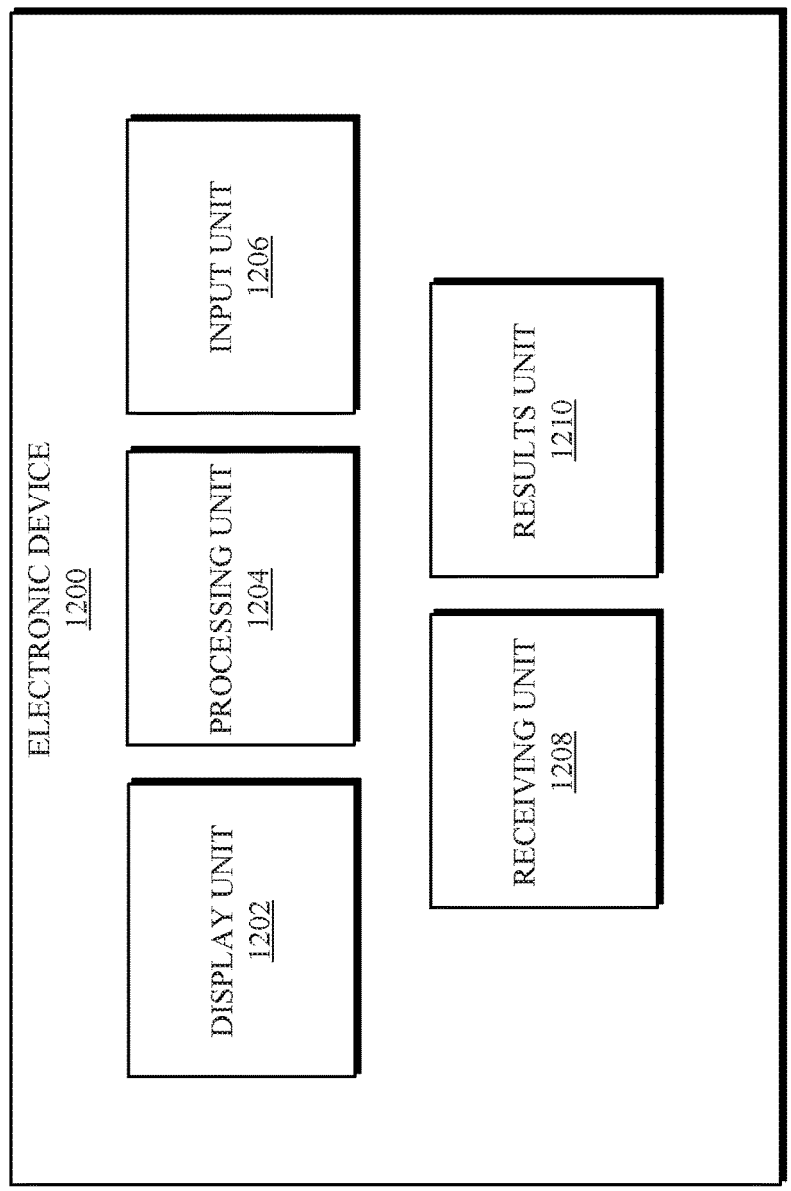
FIG. 12 is a functional block diagram of an electronic device including operational units arranged to perform various operations of the presently disclosed technology.

Turning to FIG. 12, an electronic device 1200 including operational units 1202-1214 arranged to perform various operations of the presently disclosed technology is shown. The operational units 1202-1214 of the device 1200 are implemented by hardware or a combination of hardware and software to carry out the principles of the present disclosure. It will be understood by persons of skill in the art that the operational units 1202-1214 described in FIG. 12 may be combined or separated into sub-blocks to implement the principles of the present disclosure. Therefore, the description herein supports any possible combination or separation or further definition of the operational units 1202-1214.

In one implementation, the electronic device 1200 includes a display unit 1202 to display information, such as the interactive user interface 100 or other graphical user interface, and a processing unit 1204 in communication with the display unit 1202 and an input unit 1206 to receive data from one or more input devices or systems, such as the input devices 214. Various operations described herein may be implemented by the processing unit 1204 using data received by the input unit 1206 to output information for display using the display unit 1202.

Additionally or alternatively, the electronic device 1200 may include a receiving unit 1208 and a results unit 1210. The receiving unit 1208 receives information of an object in an external environment, such as from a database of such information. The results unit 1210 determines which object from a plurality of objects in the vicinity of the machine a user is selecting.

Figure 13:
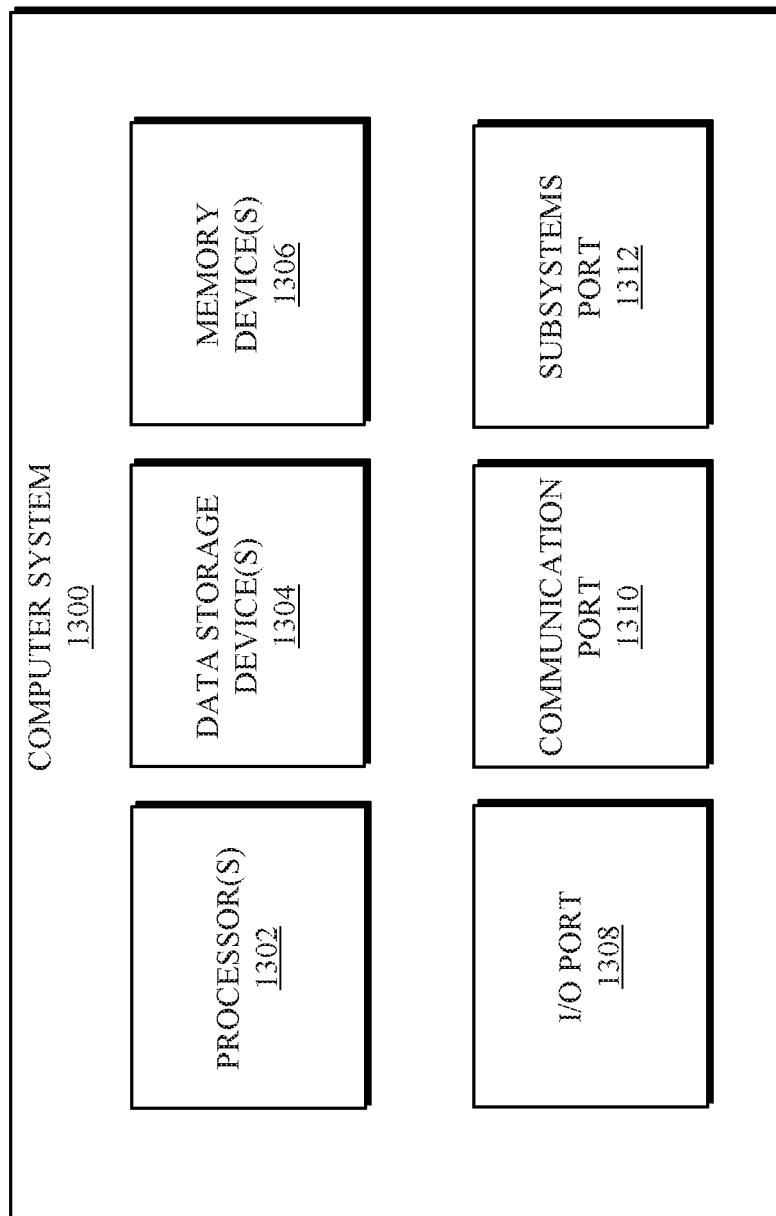
FIG. 13 is an example computing system that may implement various systems and methods of the presently disclosed technology.

Referring to FIG. 13, a detailed description of an example computing system 1300 having one or more computing units that may implement various systems and methods discussed herein is provided. The computing system 1300 may be applicable to the object selection controller 202, the machine controller 204, the dedicated machine components 206, the input devices 214, the output devices 216, the server 222, and other computing or network devices. It will be appreciated that specific implementations of these devices may be of differing possible specific computing architectures not all of which are specifically discussed herein but will be understood by those of ordinary skill in the art.

The computer system 1300 may be a computing system is capable of executing a computer program product to execute a computer process. Data and program files may be input to the computer system 1300, which reads the files and executes the programs therein. Some of the elements of the computer system 1300 are shown in FIG. 13, including one or more hardware processors 1302, one or more data storage devices 1304, one or more memory devices 1308, and/or one or more ports 1308-1312. Additionally, other elements that will be recognized by those skilled in the art may be included in the computing system 1300 but are not explicitly depicted in FIG. 13 or discussed further herein. Various elements of the computer system 1300 may communicate with one another by way of one or more communication buses, point-to-point communication paths, or other communication means not explicitly depicted in FIG. 13.

The processor 1302 may include, for example, a central processing unit (CPU), a microprocessor, a microcontroller, a digital signal processor (DSP), and/or one or more internal levels of cache. There may be one or more processors 1302, such that the processor 1302 comprises a single central-processing unit, or a plurality of processing units capable of executing instructions and performing operations in parallel with each other, commonly referred to as a parallel processing environment.

The computer system 1300 may be a conventional computer, a distributed computer, or any other type of computer, such as one or more external computers made available via a cloud computing architecture. The presently described technology is optionally implemented in software stored on the data stored device(s) 1304, stored on the memory device(s) 1306, and/or communicated via one or more of the ports 1308-1312, thereby transforming the computer system 1300 in FIG. 12 to a special purpose machine for implementing the operations described herein. Examples of the computer system 1300 include personal computers, terminals, workstations, mobile phones, tablets, laptops, personal computers, multimedia consoles, gaming consoles, set top boxes, and the like.

The one or more data storage devices 1304 may include any non-volatile data storage device capable of storing data generated or employed within the computing system 1300, such as computer executable instructions for performing a computer process, which may include instructions of both application programs and an operating system (OS) that manages the various components of the computing system 1300. The data storage devices 1304 may include, without limitation, magnetic disk drives, optical disk drives, solid state drives (SSDs), flash drives, and the like. The data storage devices 1304 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1306 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1304 and/or the memory devices 1306, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1300 includes one or more ports, such as an input/output (I/O) port 1308, a communication port 1310, and a subsystems port 1312, for communicating with other computing, network, or vehicle devices. It will be appreciated that the ports 1308-1312 may be combined or separate and that more or fewer ports may be included in the computer system 1300.

The I/O port 1308 may be connected to an I/O device, or other device, by which information is input to or output from the computing system 1300. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1300 via the I/O port 1308. Similarly, the output devices may convert electrical signals received from computing system 1300 via the I/O port 1308 into signals that may be sensed as output by a human, such as sound, light, and/or touch. The input device may be an alphanumeric input device, including alphanumeric and other keys for communicating information and/or command selections to the processor 1302 via the I/O port 1308. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 1300 via the I/O port 1308. For example, an electrical signal generated within the computing system 1300 may be converted to another type of signal, and/or vice-versa. In one implementation, the environment transducer devices sense characteristics or aspects of an environment local to or remote from the computing device 1300, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 1300, such as, physical movement of some object (e.g., a mechanical actuator), heating or cooling of a substance, adding a chemical substance, and/or the like.

In one implementation, a communication port 1310 is connected to a network by way of which the computer system 1300 may receive network data useful in executing the methods and systems set out herein as well as transmitting information and network configuration changes determined thereby. Stated differently, the communication port 1310 connects the computer system 1300 to one or more communication interface devices configured to transmit and/or receive information between the computing system 1300 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1310 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1310 may communicate with an antenna or other link for electromagnetic signal transmission and/or reception. In some examples, an antenna may be employed to receive Global Positioning System (GPS) data to facilitate determination of a location of a machine, vehicle, or another device.

The computer system 1300 may include a subsystems port 1312 for communicating with one or more systems related to a vehicle to control an operation of the vehicle and/or exchange information between the computer system 1300 and one or more subsystems of the vehicle. Examples of such subsystems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, machine status information, user status information, the interactive user interface 100, and software and other modules and services may be embodied by instructions stored on the data storage devices 1304 and/or the memory devices 1306 and executed by the processor 1302. The computer system 1300 may be integrated with or otherwise form part of a vehicle. In some instances, the computer system 1300 is a portable device that may be in communication and working in conjunction with various systems or subsystems of a vehicle.

The present disclosure recognizes that the use of information discussed herein may be used to the benefit of users. For example, machine status information, including navigation information, may be used to facilitate user understanding of statuses, actions, and decisions of an autonomous machine, and the navigation information may be used to provide targeted information concerning a "best" path or route to the vehicle. Use of such information enables calculated control of an autonomous vehicle, while providing the user with a simple and intuitive interactive interface related thereto. Moreover, the user status information may be used to provide an optimized user travel experience and management of travel, activities, tasks, and scheduling. Further, other uses for machine status information and user status information that benefit a user are also contemplated by the present disclosure.

Users can selectively block use of, or access to, personal data, such as location and user status information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 12 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for interaction with a device, the method comprising:
   receiving a non-tactile selection through an input system indicating a real-world object in an external environment to the device;
   estimating an approximate geographic location of the device;
   obtaining a subset of external real-world object indicators from a database of real-world objects that are located within the external environment for the estimated approximate geographic location of the device;

determining the real-world object being indicated by selecting at least one object from the subset of external real-world object indicators as a disambiguated selection based at least on the non-tactile selection and a popularity score of each for the subset of external real-world object indicators, the at least one object including the real-world object, the popularity score including a general popularity score and an object-type popularity score, the general popularity score corresponding to a selection of a respective external real-world object indicator over a period of time, the object-type popularity score corresponding to a selection of a respective external real-world object indicator from a group of the subset of external real-world object indicators having a same object-type; and displaying a representation of the at least one object of the subset of external object indicators.

2. The method of claim 1 wherein the device includes a display device disposed in the device, the representation of the at least one object displayed with the display device of the device.

3. The method of claim 1 wherein displaying the representation of the at least one object of the subset of external object indicators comprises transmitting the representation of the at least one object to a display device of a mobile device.

4. The method of claim 1 further comprising:
updating the display of the representation of the at least one object based on a measured movement of the device relative to a determined geographic position of the at least one object from the subset of external real-world object indicators.

5. The method of claim 1 further comprising:
receiving an affirmation of the at least one object of the subset of external object indicators as a selected real-world object in the external environment to the device; and
updating the popularity score of one or more of the subset of external real-world object indicators of the database of real-world objects based on the affirmation.

6. The method of claim 1 wherein the received non-tactile selection of the real-world object in the external environment to the device comprises a gesture of a user of the device.

7. The method of claim 6 wherein the received non-tactile selection of the real-world object in the external environment to the device is detected by a visual sensor device.

8. The method of claim 1 wherein the received non-tactile selection of the real-world object in the external environment to the device comprises a verbal description of the object external to the device.

9. The method of claim 8 wherein the received non-tactile selection of the real-world object in the external environment to the device is detected by an audio detection device.

10. The method of claim 1, wherein the at least one object further includes at least one candidate real-world object.

11. A system for interacting with a mobile device, the system comprising:
an input device receiving a non-tactile selection of a real-world object in an external environment to the mobile device;
a location device estimating an approximate geographic location of the mobile device;
a database storing a plurality of external real-world object indicators corresponding to known real-world objects that are located in the external environment to the mobile device;
a computing device selecting the real-world object from a subset of the plurality of external real-world object indicators by disambiguating the non-tactile selection, the subset of the plurality of external real-world object indicators corresponding to the known real-world objects identified based on the approximate geographic location of the mobile device and a popularity score for one or more of the plurality of external real-world object indicators, the popularity score including a general popularity score and an object-type popularity score, the general popularity score corresponding to a selection of a respective external real-world object indicator over a period of time, the object-type popularity score corresponding to a selection of a respective external real-world object indicator from a group of the subset of external real-world object indicators having a same object-type; and
a display device displaying a representation of the real-world object.

12. The system of claim 11 wherein the computing device transmits the representation of the real-world object to the display device.

13. The system of claim 11 wherein the representation of the real-world object is updated based on a measured movement of the mobile device relative to a determined geographic position of the real-world object.

14. The system of claim 11 wherein the input device includes a visual sensor detecting a gesture of a user of the mobile device, wherein the non-tactile selection of the real-world object in the external environment to the device comprises the gesture.

15. The system of claim 11 wherein the input device includes an audio detection sensor detecting a verbal description of the real-world object in the external environment and wherein the non-tactile selection of the real-world object in the external environment to the device comprises the verbal description.

16. The system of claim 11, wherein the popularity score further includes a user popularity score corresponding to previous selections of a respective external real-world object indicator by a user of the mobile device.

17. A computer-readable data storage medium comprising instructions that, when executed by at least one processor of a mobile device, cause the mobile device to perform operations comprising:
receiving a non-tactile selection through an input system of a real-world object in an external environment to the mobile device;
estimating an approximate geographic location of the mobile device;
accessing a database of a plurality of external real-world object indicators corresponding to real-world objects that are located in the external environment to the mobile device;
obtaining a subset of external real-world object indicators from the plurality of external real-world object indicators based on the approximate geographic location, the subset of external real-world object indicators corresponding to one or more known real-world objects, the one or more known real-world objects each being a candidate for the real-world object;
selecting at least one object from the subset of external real-world object indicators as a disambiguated selection based at least on the non-tactile selection device and a popularity score associated with one or more of the subset of external real-world object indicators, the popularity score including a general popularity score and an object-type popularity score, the general popularity score corresponding to a selection of a respective external real-world object indicator over a period of time, the object-type popularity score corresponding to a selection of a respective external real-world object indicator from a group of the subset of external real-world object indicators having a same object-type; and displaying a representation of the at least one object of the subset of external object indicators.

18. The computer-readable data storage medium of claim 17 wherein the mobile device is further caused to perform the operations of:

determining an updated geographic location of the mobile device and updating the representation of the at least one object based on the updated geographic location of the mobile device relative to a determined position of the at least one object.

19. The method of claim 17, wherein the representation of the at least one object is displayed in a ranking of potential objects.

20. The method of claim 17, wherein displaying the representation of the at least one object includes spatially orienting the representation of the at least one object relative to a user of the mobile device.

21. The system of claim 11, wherein displaying the representation of the real-world object includes spatially orienting the representation relative to a user of the mobile device.

\* \* \* \* \*